United States Patent [19]
Kanato et al.

[11] Patent Number: 5,770,642
[45] Date of Patent: Jun. 23, 1998

[54] CATHODIC ELECTRODEPOSITION PAINT

[75] Inventors: Hirotaka Kanato, Osaka; Makoto Ando, Suita; Yoshio Kojima, Nara; Mitsuo Yamada, Suita; Ryoichi Murakami, Nara, all of Japan

[73] Assignee: Nippon Paint Co., Ltd., Osaka, Japan

[21] Appl. No.: 807,208

[22] Filed: Feb. 28, 1997

[30] Foreign Application Priority Data

Mar. 1, 1996 [JP] Japan .................................. 8-071413
Mar. 1, 1996 [JP] Japan .................................. 8-071414

[51] Int. Cl.$^6$ .............................. C08K 3/20; C08L 63/02
[52] U.S. Cl. ......................... 523/404; 204/505; 205/317
[58] Field of Search .......................... 523/404; 204/505; 205/317

[56] References Cited

U.S. PATENT DOCUMENTS

| | | | |
|---|---|---|---|
| 4,260,727 | 4/1981 | Floyd | 528/45 |
| 5,446,077 | 8/1995 | Yamada et al. | 523/415 |
| 5,447,973 | 9/1995 | Yamada et al. | 523/415 |
| 5,587,059 | 12/1996 | Yamoto et al. | 204/505 |

FOREIGN PATENT DOCUMENTS 4081415  3/1992  Japan .

*Primary Examiner*—Melvyn I. Marquis
*Assistant Examiner*—D. Aylward
*Attorney, Agent, or Firm*—Millen, White, Zelano & Branigan, P.C.

[57] ABSTRACT

Cathodic electrodeposition paints of the type in which a cationically modified epoxy resin is crosslinked with a blocked polyisocyanate crosslinker are disclosed. The paint contains a cationically modified epoxy resin having at least one oxazolidone ring in the molecule and a Tg ranging between 0° C. and 35° C., and a blocked alicyclic polyisocyanate. The use of lead based anticorrosive pigments may be eliminated or substantially reduced. When the alicyclic polyisocyanate is a bicycloalkane polyisocyanate, the use of organic solvent may also be reduced.

17 Claims, No Drawings

CATHODIC ELECTRODEPOSITION PAINT

BACKGROUND OF THE INVENTION

This invention relates to a cathodic electrodeposition paint. More particularly, it relates to a cathodic electrodeposition paint of the type in which a cationic modified epoxy resin is crosslinked with a blocked polyisocyanate crosslinker to form a cured film.

Cathodic electrodeposition paints containing a cationic modified epoxy resin and a blocked polyisocyanate crosslinker are well-known and widely used as primer coatings of automobile bodies and parts. Due to the susceptibility to yellowing of over coatings, aromatic polycyanates are not used; instead non-yellowing aliphatic or alicyclic polyisocyanate crosslinkers are used for applications where yellowing of overcoatings is to be avoided.

Electrodeposition paints used for primer coatings of iron and steel substrates generally contain an effective amount of a lead-containing anti-corrosive pigment such as basic lead silicate. Because of ecological concern about the toxicity of lead-based anticorrosive pigments, it is desirable to eliminate or reduce the amount of lead-based pigments in the paint. It has been discovered, however, that the reduction or elimination of the lead-containing pigment content in the paint often has an adverse effect on the performance of cured films such as anticorrosive and weatherability properties particularly when the crosslinker is a non-yellowing blocked polyisocyanate crosslinker.

It has also been discovered that systems containing conventional non-yellowing blocked polyisocyanate crosslinkers require a relatively large amount of organic solvent to optimize the electrodeposition performance of the paint diluted to a concentration suitable for introducing to the electrodeposition bath. It is desirable, therefore, to decrease the amount of organic solvents in the paint containing a non-yellowing blocked polyisocyanate crosslinker also for ecological reasons.

SUMMARY OF THE INVENTION

The present invention provides a cathodic electrodeposition paint which is lead-free or has a reduced lead content. Nevertheless, the paint of the present invention exhibits enhanced film performance including low-temperature curing, surface smoothness, anticorrosive and non-yellowing properties.

The paint according to the first aspect of the present invention comprises a mixture of (a) a cationic modified epoxy resin containing at least one oxazolidone ring in the molecule and having a Tg ranging between 10° C. and 35° C. and (b) a blocked alicyclic polyisocyanate crosslinker dispersed in an aqueous medium containing a neutralizing agent, the paint having a lead ion concentration of less than 800 ppm.

In a preferred embodiment, said oxazolidone ring-containing, cationic modified epoxy resin is prepared by reacting a diglycidyl ether epoxy resin with a soft segment-containing bisurethane to produce an oxazolidone ring-containing epoxy resin and then reacting the resultant epoxy resin with an active hydrogen compound capable of introducing a cationic group to open the epoxy rings with the active hydrogen compound.

In a preferred embodiment, the blocked polyisocyanate crosslinker is prepared by blocking with a lactam or oxime blocking agent isophoronediisocyanate, 2,5- or 2,6-bis (isocyanatomethyl)bicyclo [2.2.1]heptane, hydrogenated tolylenediisocyanate (hydrogenated TDI), hydrogenated diphenylmethanediisocyanate (hydrogenated MDI), hydrogenated xylylenediisocyanate (hydrogenated XDI), a dimer, trimer or polyhydric alcohol adduct of these diisocyanates.

The present invention also provides a cathodic electrodeposition paint which exhibits satisfactory electrodeposition performance without adversely affecting other properties at a minimum organic solvent content when diluted to a concentration suitable for introducing into the electrodeposition bath. According to this second aspect of the present invention, the paint comprises a mixture of (a) a cationic modified epoxy resin and (b) a blocked bicycloalkane polyisocyanate crosslinker dispersed in an aqueous medium containing a neutralizing agent.

In a preferred embodiment, the bicycloalkane polyisocyanate crosslinker is prepared by reacting 2,5- or 2,6-bis (isocyanatomethyl)bicyclo[2.2.1]heptane, a dimer, trimer or polyhydric alcohol adduct thereof with a lactam or oxime blocking agent.

The cathodic electrodeposition paint according to either aspect of the present invention preferably contains said cationic modified epoxy resin and said blocked polyisocyanate crosslinker at a weight ratio as solids from 95:5 to 45:50, more preferably from 85:15 to 70:30.

When the blocked polyisocyanate crosslinker is a blocked bicycloalkane polyisocyanate, the organic solvent content may be less than 2% by weight of the paint after diluting to a concentration suitable for introducing into the electrodeposition bath.

Other features and advantages of the invention will become apparent as the description proceeds.

DETAILED DESCRIPTION OF THE INVENTION

Cationic Modified Epoxy Resin

The cationic modified epoxy resins used in cathodic electrodeposition paints are well-known as disclosed in JP-A-54004978 and JP-A-56034186. Typically, they are produced by reacting a bisphenol type epoxy resin with a cationic active hydrogen compound alone or in combination with a non-cationic active hydrogen compound to open all epoxy rings with the active hydrogen compound. Examples of bisphenol type epoxy resins include bisphenol A epoxy resins such as EPIKOTE 828 having an epoxy equivalent weight of 180–190, EPIKOTE 1001 having an epoxy equivalent weight of 450–500, and EPIKOTE 1010 having an epoxy equivalent weight of 3,000–4,000; and bisphenol F epoxy resins such as EPIKOTE 807 having an epoxy equivalent weight of 170. These resins are available from Yuka Shell Epoxy Co., Ltd. Oxazolidone ring-containing epoxy resins may also be used as the starting epoxy resin as disclosed in commonly assigned U.S. Pat. No. 5,276,072.

It is known that a chain extended, oxazolidone ring-containing epoxy resin may be produced by reacting a bifunctional epoxy resin such as bisphenol epoxy resins with a bisurethane produced by blocking a diisocyanate with a monoalcohol. See, Iwakura et al., J. Polymer Sci., Part A-1, 4:751 (1966). Cationic modified epoxy resins produced by reacting the above oxazolidone ring-containing epoxy resin with an amine have a relatively high Tg.

A cationic modified oxazolidone ring-containing epoxy resin having a Tg ranging between 10° C. and 35° C. may be produced as disclosed in commonly assigned U.S. Pat. Nos. 5,446,077 and 5,536,804, by reacting a bifunctional epoxy resin with an asymmetric diisocyanate-based bisurethane produced by reversibly blocking one isocyanate group of the diisocyanate with a monoalcohol and irreversibly blocking the other isocyanato group with a hydroxyl compound having a soft segment to attach the blocked diisocyanate moiety through an oxazolidone linkage, and then ring opening the remaining epoxy ring with an amine. The entire disclosures of the above United States patents are incorporated herein by reference. Examples of soft segment-containing hydroxyl compounds used for irreversibly blocking the other isocyanato group include aliphatic monoalcohols having four or more carbon atoms such as butanol or 2-ethylhexanol, long chain alkylphenols such as nonylphonol, and glycol monoethers such as ethylene- or propylene glycol mono- 2-ethylhexyl ether.

Cationically modified, oxazolidone ring-containing epoxy resins having a Tg of the above range may also be produced by the method as disclosed in commonly assigned U.S. Pat. No. 5,447,973 which is incorporated herein by reference. In this case, a bifunctional epoxy resin is reacted with, instead of the asymmetric bisurethane, a blocked urethane prepolymer produced by reacting a diisocyanate and a bifunctional active hydrogen compound containing a soft segment and reversibly blocking the terminal isocyanato groups to chain-extend the bifunctional epoxy resin with the urethane prepolymer, and ring opening the terminal epoxy groups of the resulting chain extended epoxy resin with an amine. Examples bifunctional active hydrogen compounds include polyether diols, polyester diols, polyoxyalkylene diamines, bifunctional long chain-fatty acids, carboxyl-terminated nitril rubber oligomers, hydroxyl-terminated polybutadiene oligomers.

Active hydrogen compounds for introducing a cationic group are a primary or secondary amine, a tertiary amine acid addition salt, or a sulfide-acid mixture. Examples thereof include butylamine, octylamine, diethylamine, dibutylamine, methylbutylamine, monoethanolamine, diethanolamine, N-methylethanolamine, triethylamine hydrochloride, N,N-dimethylethanolamine acetate, diethyldisulfide-acetic acid mixture, and secondary amines having a ketiminized primary amino group such as aminoethylethanolamine ketimine or diethylenetriamine diketimine. A mixture of amines may also be used. Examples of non-cationic active hydrogen compounds include monophenols such as phenol, cresol, nonylphenol or nitrophenol; monoalcohols such as hexyl alcohol, 2-ethylhexanol, stearyl alcohol, monobutyl- or monohexyl ether of ethylene glycol or propylene glycol; aliphatic monocarboxylic acids such as acetic or stearic acid; aliphatic hydroxycarboxylic acids such as glycolic, dimethylolpropionic, hydroxypivalic, lactic or citric acid; and mercaptoalkanols such as mercaptoethanol.

The cationically modified epoxy resins preferably have an amine or cation equivalent of from 0.3 to 4.0 meq/g.

Blocked Polyisocyanate Crosslinker

The blocked polyisocyanate crosslinkers used in the present invention are prepared by reacting a alicyclic polyisocyanate compound with a stoichimetric amount of a blocked agent. Examples of the starting alicyclic polyisocyanate compounds include hydrogenated TDI, hydrogenated XDI, hydrogenated MDI, IPDI, bicycloalkane diisocyanate such as 2,5- or 2,6-bis(isocyanatomethyl)-bicyclo[2.2.1]heptane otherwise called norbornanediiso-cyanate, and dimers, trimers and polyhydric alcohol adducts of these alicyclic diisocyanates. The use of a bicycloalkane diisocyanate such as 2,5- or 2,6-bis(isocyanatomethyl)-bicyclo [2.2.1]heptane allows the use of a minimum amount of organic solvents, i.e. less than 2% to impart a satisfactory electrodeposition property to the paint when diluted for introducing into the electrodeposition bath. In other words, the amount of organic solvent to be added for improving the surface smoothness of electrically deposited paint films can be minimized. Alicyclic polyisocyanates including bicycloalkane polyisocyanates are non-yellowing and superior to aliphatic polyisocyanates such as HMDI in anticorrosive properties.

A variety of blocking agents are known in the art to block a free isocyanate group so that the blocked product is insert and stable at room temperature but capable of regenerating free isocyanate function by thermal dissociation of the blocking agent upon heating to a temperature above the dissociation point. Examples of blocking agents include phenols such as phenol, cresol, xylenol, chlorophenol or ethylphenol; lactams such as ε-caprolactam, δ-valerolactam, γ-butyrolactam, or β-propiolactam; activated methylene compounds such as ethyl acetoacetate or acetylacetone; alcohols such as methanol, ethanol, propanol, butanol, amyl alcohol, ethylene glycol monomethyl ether, ethylene glycol monoethyl ether, ethylene glycol monobutyl ether, diethylene glycol monomethyl ether, propylene glycol monomethyl ether, benzyl alcohol, methyl glycolate, butyl glycolate, diacetone alcohol, methyl lactate or ethyl lactate; oximes such as formaldoxime, acetaldoxime, acetoxime, methyl ethyl ketoxime, diacetyl monooxime or cyclohexanoxime; mercaptans such as butylmercaptan, hexylmercaptan, t-butylmercaptan, thiophenol, methylthiophenol or ethylthiophenol; amides such as acetamide or benzamide; imides such as succinimide or maleimide; amines such as xylidine, aniline, butylamine or dibutylamine; imidazoles such as imidazole or 2-ethylimidazole; and imines such as ethyleneimine or propyleneimine. Oximes such as methyl ethyl ketoxime and lactams such as ε-caprolactam are used to advantage.

Electrodeposition Paint

The electrodeposition paint of the present invention may be prepared by dispersing the cationically modified epoxy resin and the blocked polyisocyanate crosslinker in an aqueous medium containing a neutralizing acid. Examples of neutralizing acid are hydrochloric, nitric, phosphoric, formic, acetic or lactic acid. The amount thereof is such that at least 20%, preferably 30 to 60% neutralization of the cationic resin is achieved. The amount of crosslinker must be sufficient to give a rigid film through a crosslinking reaction with amino, hydroxyl or other active hydrogen-containing groups. The ratio of the cationic resin to the crosslinker generally lies between 95:5 and 45:50, preferably between 85:15 and 70:30 by weight as solids. The paint may contain from 0.1 to 5% by weight of the crosslinker of a catalyst such as dibutyltin dilaurate, dibutyltin oxide or other urethane-cleaving catalysts.

The paint formulation may contain a variety of conventional additives. Examples thereof include coloring pigments such as titanium dioxide, carbon black or ferric oxide; anticorrosive pigments such as aluminum phosphomolybdate; extender pigments such as kaolin, talc or clay; and other additives such as water-miscible organic solvents, surfactants, antioxidants, UV absorbers and the like. Lead-containing pigments such as basic lead silicate are added not at all or in an amount such that the paint as diluted to a concentration suitable for actual electrodeposition in the bath contains less than 800 ppm, preferably less than 500 ppm of the lead ions. Higher lead ion concentrations are not only ecologically harmful but also may impair the surface smoothness of films formed therefrom.

The following Examples are intended to illustrate the invention without limiting thereto. All parts and percents therein are by weight unless otherwise indicated.

PRODUCTION EXAMPLE 1

Cationic Resin A

A flask equipped with a stirrer, condenser, nitrogen gas tube, thermometer and drip funnel was charged with 70 parts of 2,4-/2,6-tolylenediisocyanate(80:20 weight ratio), 109 parts of methyl isobutyl ketone (MIBK) and 0.35 parts of dibutyltin dilaurate. To the mixture was added dropwise 21 parts of methanol over 30 minutes while stirring and nitrogen gas bubbling. The inner temperature rose to 60° C. during this period. After continuing the reaction for additional 30 minutes, 57 parts of ethylene glycol mono-2-ethylhexyl ether were added dropwise over 30 minutes. After continuing the reaction for additional 30 minutes, 42 parts of bisphenol A-propylene oxide (5 moles) adduct (BP-5P sold by Sanyo Chemical Industries, Ltd.) were added and allowed to react at 60°–65° C. until the absorption of NCO group disappeared in the IR spectrometry.

Then 365 parts of bisphenol A epoxy resin having an epoxy equivalent weight of 188 were added. After raising the temperature to 125° C., 1 part of benzyldimethylamine was added. Then, the reaction was continued at 130° C. until an epoxy equivalent of 410 was reached. To this were added 87 parts of bisphenol A and the mixture allowed to react at 120° C. until an epoxy equivalent weight of 1190 was reached.

After cooling to 100° C., 24 parts of N-methylethanolamine, 11 parts of diethanolamine and 25 parts of aminoethylethanolamine ketimine (79.0% solution in MIBK) were added to the reaction mixture and allowed to react at 110° C. for 2 hours. The product was diluted with MIBK to 80% nonvolatiles. Cationic Resin A having a Tg of 22° C. was obtained.

PRODUCTION EXAMPLE 2

Cationic Resin B

A flask equipped with a stirrer, condenser, nitrogen gas tube, thermometer and drip funnel was charged with 70 parts of 2,4-/2,6-tolylenediisocyanate(80:20 weight ratio), 109 parts of MIBK and 0.35 parts of dibutyltin dilaurate. To the mixture were added dropwise 21 parts of methanol over 30 minutes while stirring and nitrogen gas bubbling. The inner temperature rose to 60° C. during this period. After continuing the reaction for additioanl 30 minutes, 47 parts of ethylene glycol mono-2-ethylethyl ether were added dropwise over 30 minutes. After continuing the reaction for additional 30 minutes, 42 parts of bisphenol A-propylene oxide (5 moles) adduct (BP-5P sold by Sanyo Chemical Industries, Ltd.) were added and allowed to react at 60°–65° C. until the absorption of NCO group disappeared in the IR spectrometry.

Then 475 parts of bisphenol F epoxy resin having an epoxy equivalent weight of 475 were added to the flask and allowed to make a uniform solution. After the addition of 1.5 parts of benzyldimethylamine, the mixture was allowed to react at 130° C. until an epoxy equivalent weight of 1140 was reached.

After cooling, 25 parts of N-methylethanolamine, 11.0 parts of diethanolamine and 24 parts of aminoethylethanolamine ketimine (79.0% solution in MIBK) were added to the reaction mixture and allowed to react at 110° C. for 2 hours. The product was diluted with MIBK to 90% nonvolatiles. Cationic Resin B having a Tg of 25° C. was obtained.

PRODUCTION EXAMPLE 3

Cationic Resin C

Into a flask equipped with a stirrer, condenser, nitrogen gas tube, thermometer and drip funnel were added 752.0 parts of bisphenol A epoxy resin having an epoxy equivalent weight of 188, 77.0 parts of methanol, 200.3 parts of MIBK and 0.3 parts of dibutyltin dilaurate. The mixture was stirred at room temperature to make a homogenous solution. To this were added dropwise 174.2 parts of 2,4-/2,6-tolylenediisocyanate (80:20 weight ratio) over 50 minutes. The inner temperature rose to 70° C. during this period. The IR spectrometry indicated the absence of isocyanato group at 2280 $cm^{-1}$ and the presence of urethane carbonyl group at 1730 $cm^{-1}$. After the addition of 2.7 parts of benzyldimethylamine, the inner temperature was raised to 120° C. and the reaction continued until an epoxy equivalent of 463 was reached while distilling off methanol produced as a by-product. The IR spectrometry indicated the absence of urethane carbonyl group at 1730 $cm^{-1}$ and the presence of oxazolidone carbonyl at 1750 $cm^{-1}$. Then 220.0 parts of nonylphenol and 83.3 parts of MIBK were added and allowed to react at 125° C. until an epoxy equivalent weight of 1146 was reached. After cooling the reaction mixture to 110° C. 47.2 parts of aminoethylethanolamine ketimine (79.0% solution in MIBK), 42.0 parts of diethanolamine, 30.0 parts of N-methylethanolamine and 17.3 parts of MIBK were added and allowed to react with the mixture at 120° C. for 2 hours. Cationic Resin C having 80% nonvolatiles and a Tg of 32° C. was obtained.

PRODUCTION EXAMPLE 4

Cationic Resin D

The same reactor as used in Production Example 1 was charged with 285.0 parts of bisphenol A epoxy resin having an epoxy equivalent of 475, 380 parts of bisphenol A epoxy resin having an epoxy equivalent of 950, 77.0 parts of p-nonylphenol and 82.4 parts of MIBK. After the addition of 3.0 parts of dimethylbenzylamine, the mixture was allowed to react at 130° C. until an epoxy equivalent weight of 1140 was reached. After cooling, the product was allowed to react with a mixture of 19.2 parts of diethanolamine, 27.0 parts of N-methylaminoethanol and 30.6 parts of aminoethylethanol-amine ketimine (79% solution in MIBK) at 110° C. for two hours, and diluted to 80% nonvolatiles with MIBK to obtain Cationic Resin D.

PRODUCTION EXAMPLE 5

Cationic Resin E (For Comparison)

Production Example 1 was followed except that bisphenol A-propylene oxide adduct was not added and the amount of TDI was increased correspondingly. Cationic Resin E having a Tg of 40° C. was obtained.

PRODUCTION EXAMPLE 6

Cationic Resin F (For Comparison)

Production Example 1 was followed except that part of bisphenol A epoxy resin (165 parts) was replaced with the corresponding amount of polypropylene glycol diglycidyl ether (EP-400 available from Sanyo Chemical Industries, Ltd.). Cationic Resin having a Tg of 8° C. was obtained.

PRODUCTION EXAMPLE 7

Crosslinker A

Into a flask equipped with a stirrer, condenser, nitrogen gas tube, thermometer and drip funnel was added 723 parts of 2,5/2,6-bis(isocyanatomethyl)bicyclo-[2.2.1]heptane having an NCO equivalent weight of 103 (available from Mitsui Toatsu Chemicals Inc.), 333 parts of MIBK and 0.01 parts of dibutyltin dilaurate. After warming the mixture to 70° C., 610 parts of MIBK oxime were added dropwise over 2 hours and allowed to react at the same temperature until the absorption of isocyanato group disappeared in the IR spectrometry. Crosslinker A having 80% nonvolatiles was obtained.

PRODUCTION EXAMPLE 8

Crosslinker B

Production Example 7 was followed except that 2,5/2,6-bis(isocyanatomethyl)bicyclo[2.2.1]heptane was replaced with hydrogenated MDI (Desmodur W available from Sumitomo Bayer Urethane Co., Ltd.) to obtain Crosslinker B having 80% nonvolatiles.

PRODUCTION EXAMPLE 9

Crosslinker C

Production Example 7 was followed except that 2,5/2,6-bis(isocyanatomethyl)bicyclo[2.2.1]heptane was replaced with IPD to obtain Crosslinker C having 80% nonvolatiles.

PRODUCTION EXAMPLE 10

Crosslinker D

Into the same flask as used in Production Example 7 was added 500 parts (50% solids) isocyanurate type trimer of 2,5/2,6-bis(isocyanatomethyl)bicyclo[2.2.1]heptane (available from Mitsui Toatsu Chemical Inc.) and 0.01 parts of dibutyltin dilaurate. After warming the mixture to 70° C. 100 parts of MIBK oxime were added dropwise over 2 hours and allowed to react at 70° C. until the absorption of isocyanato group disappeared in the IR spectrometry. Crosslinker D having 58.3 nonvolatiles was obtained.

PRODUCTION EXAMPLE 11

Crosslinker E (For Comparison)

Into the same flask as used in Production Example 7 was added 134 parts of trimethylopropane and 300 parts of MIBK. After warming the mixture to 80° C., 400 parts of TDI were added dropwise over 1 hour and allowed to react at 80° C. for additional 4 hours. After cooling the mixture to 50° C., 147 parts of MIBK oxime were added dropwise and allowed to react at 50° C. for additional 1 hour. Crosslinker E having 70% nonvolatiles was obtained.

PRODUCTION EXAMPLE 12

Crosslinker F (For Comparison)

Into the same flask as used in Production Example 7 was added 199 parts of isocyanurate trimer of HMDI (Coronate HX available from Nippon Polyurethane Co., Ltd.), 32 parts of MIBK and 0.2 parts of dibutyltin dilaurate. After warming the mixture to 50° C., 87 parts of MIBK oxime were added dropwise over 2 hours while keeping the inner temperature at 50° C. with cooling externally. After the addition, the temperature was raised to 70° C. and the reaction was allowed to continue until the absorption of NCO group disappeared in the IR spectrometry. Crosslinker F having 90% nonvolatiles was obtained.

PRODUCTION EXAMPLE 13

Pigment Dispersed Paste

A pigment dispersant resin varnish was produced by reacting bisphenol A epoxy resin having an epoxy equivalent weight 450 first with 2-ethylhexanol-half blocked IPDI and then with a mixture of 1-(2-hydroxyethylthio)-2-propanol and dimethylolpropionic acid to produce a resin varnish of 60% solids having percent conversion to sulfoninium of 70.6.

Into a sand grind mill was added 125.0 parts of the above resin varnish, 400.0 parts of deionized water, 6.0 parts of carbon black, 124.0 parts of kaolin, 350.0 parts of titanium dioxide and 20.0 parts of basic lead silicate. The mixture was milled until a particle size of less than 10 μm was reached. For lead-free pigment paste, basic lead silicate was replaced with the same amount of titanium dioxide. When appropriate, the Pb content in the paste was adjusted with the addition of lead acetate.

EXAMPLES 1–7 AND COMPARATIVE EXAMPLES 1–5

Cationic Resins A–C, D and F and Crosslinkers A–C, E and F were blended in various combinations and proportions (as solids) shown in Tables 1 and 2. After the addition of 3% of the solids of ethylene glycol mono-2-ethylhexanol, the mixture was neutralized with glacial acetic acid to 43.0% neutralization. The neutralizate was diluted slowly with deionized water and then evaporated in vacuo to remove MIBK until a solids content of 36.0% was reached.

2000 parts of the main emulsion thus produced were mixed with 460.0 parts of the pigment dispersed paste of Production Example 13, 2252 parts of deionized water and 1% of the solids of dibutyltin oxide to obtain a cathodic electrodeposition paint of 20.0% solids.

The paint was applied electrically onto a zinc phosphate treated steel plate to a dry film thickness of 20 μm, baked at 150° C. for 10 minutes, and tested for the performance of the cured film. The results are shown in Tables 1 and 2.

TABLE 1

| Formulation | EXAMPLE | | | | | | |
|---|---|---|---|---|---|---|---|
| (parts as solids) | 1 | 2 | 3 | 4 | 5 | 6 | 7 |
| Cationic Resin A | 80 | 80 | 80 | 75 | 75 | — | — |
| Cationic Resin B | — | — | — | — | — | 80 | — |
| Cationic Resin C | — | — | — | — | — | — | 70 |
| Crosslinker A | 20 | — | — | 25 | 25 | 20 | 30 |
| Crosslinker B | — | 20 | — | — | — | — | — |
| Crosslinker C | — | — | 20 | — | — | — | — |
| $Pb^{3+}$, ppm | 500 | 500 | 500 | 0 | 800 | 500 | 350 |
| 1) Ra | G | G | G | G | G | G | G |
| 2) Corrosion resistance in salt dipping test | G | G | G | G | G | G | G |
| 3) Weatherability upon | G | G | G | G | G | G | G |

TABLE 1-continued

| Formulation | EXAMPLE | | | | | | |
|---|---|---|---|---|---|---|---|
| (parts as solids) | 1 | 2 | 3 | 4 | 5 | 6 | 7 |
| outdoor exposure | | | | | | | |
| 4) Overcoat yellowing | G | G | G | G | G | G | G |
| 5) Resin Tg, °C. | 22 | 22 | 22 | 22 | 22 | 25 | 32 |

TABLE 2

| Formulation | COMPARATIVE EXAMPLE | | | | |
|---|---|---|---|---|---|
| (parts as solids) | 1 | 2 | 3 | 4 | 5 |
| Cationic Resin A | 80 | — | — | 80 | 70 |
| Cationic Resin E | — | 80 | — | — | — |
| Cationic Resin F | — | — | 80 | — | — |
| Crosslinker A | 20 | 20 | 20 | — | — |
| Crosslinker E | ' | — | — | 20 | — |
| Crosslinker F | — | — | — | — | 30 |
| $Pb^{3+}$, ppm | 1000 | 500 | 500 | 500 | 500 |
| 1) Ra | B | * | F | ** | O |
| 2) Corrosion resistance in salt dipping test | G | | F | | B |
| 3) Weatherability upon outdoor exposure | G | | B | | F |
| 4) Overcoat yellowing | G | | B | | G |
| 5) Resin Tg, °C. | 22 | 40 | 8 | 22 | 22 |

*Uniform film was not obtained: **Paint was gelled.

EVALUATION METHOD

1) Ra (Center Line Surface Roughness)

Measurement was made with Surface Roughness Meter Model E-30A sold by Tokyo Seimitsu K.K.

G (good)=<0.25 μm
F (fair)=0.25–0.35 μm
B (bad)=>0.35 μm

2) Salt Dipping Test

The paint film was cut in cross with a knife reaching to the substrate and dipped in 5% saline for 240 hours at 55° C. Then a pressure sensitive adhesion tape was applied on the cut portion and stripped rapidly. Judgement was made according to the maximum peeled width on both sides of the cut line.

G (good)<3 mm
F (fair)=4–6 mm
B (bad)=>6 mm

3) Weatherability Upon Outdoor Exposure

The specimens as used in the salt dipping test were subjected to outdoor exposure test for six months in Okinawa and the development of blister in the cut area was visually observed.

G (good)=blister was not observed.
F (fair)=Small blister was observed.
B (bad)=blister was developed in the entire area.

4) Overcoat Yellowing

Evaluation was made according to the bleeding method.

G (good)=No change
F (fair)=Slight yellowing
B (bad)=Yellowing

5) Resin Tg

Measurement was made using Seiko Instruments Inc. Model DSC5000.

EXAMPLES 8–13 AND COMPARATIVE EXAMPLES 6 and 7

Cationic Resins C and D and Crosslinkers A, D and F were blended in various combinations and proportions (as solids) shown in Table 3. After the addition of 3% of the solids of ethylene glycol mono-2-ethylhexanol, the mixture was neutralized with glacial acetic acid to 43.0% neutralization. The neutralizate was diluted slowly with deionized water and then evaporated in vacuo to remove MIBK until a solids content of 36.0% was reached.

2000 parts of the main emulsion thus produced were mixed with 460.0 parts of the pigment dispersed paste of Production Example 13, 2252 parts of deionized water and 1% of the solids of dibutyltin oxide to obtain a cathodic electrodeposition paint of 20.0% solids.

The paint was applied electrically onto a zinc phosphate treated steel plate to a dry film thickness of 20 μm, baked at 150° C. for 10 minutes, and tested for the performance of the cured film. The results are shown in Table 3.

TABLE 3

| Formulation | EXAMPLE | | | | | | COM. EXAMPLE | |
|---|---|---|---|---|---|---|---|---|
| (parts as solids) | 8 | 9 | 10 | 11 | 12 | 13 | 6 | 7 |
| Cationic Resin D | 80 | 75 | 70 | — | — | — | 80 | 80 |
| Cation Resin C | — | — | — | 80 | 75 | 70 | — | — |
| Crosslinker A | 20 | 25 | — | 20 | 25 | — | — | — |
| Crosslinker D | — | — | 30 | — | — | 30 | — | — |
| Crosslinker F | — | — | — | — | — | — | 20 | 20 |
| % solvent | 1.0 | 0.7 | 0.5 | 1.2 | 0.9 | 0.7 | 2.5 | 1.0 |
| 1) Ra | G | G | G | G | G | G | F | B |
| 2) Corrosion resistance in salt dipping test | G | G | G | G | G | G | G | G |
| 3) Weatherability upon outdoor exposure | G | G | G | G | G | G | G | G |
| 6) Film Tg, °C. | >110 | >110 | >110 | >110 | >110 | >110 | >110 | >110 |

ADDITIONAL TEST ITEM

6) Film Tg

Dynamic Tg was determined by measuring the dynamic visoelasticity of cured films.

We claim:

1. In a cathodic electrodeposition paint comprising a mixture of (a) a cationically modified epoxy resin and (b) a blocked polyisocyanate crosslinker dispersed in an aqueous medium containing a neutralizing agent, the improvement wherein said cationically modified epoxy resin has at least one oxazolidone ring in the molecule and a Tg ranging between 10° C. and 35° C., wherein said blocked polyisocyanate crosslinker is a bicycloalkane diisocyanate or isophorone diisocyanate or a dimer, trimer or polyhydric alcohol adduct thereof, reversibly blocked with a lactam or oxime blocking agent, and wherein the paint contains less than 800 ppm of lead ions.

2. The cathodic electrodeposition paint according to claim 1, wherein said cationically modified epoxy resin is produced by reacting a diglycidyl ether epoxy resin with a bisurethane containing a soft segment to produced an oxazolidone ring-containing epoxy resin, and then reacting the remaining epoxy groups of the resultant resin with an active hydrogen compound capable of introducing the cationic group.

3. The cathodic electrodeposition paint according to claim 2, wherein said bisurethane is an asymmetric diisocyanate-based bisurethane produced by reversibly blocking one isocyanate group of the diisocyanate with a monoalcohol and irreversibly blocking the other isocyanate group with a monofunctional active hydrogen compound having the soft segment.

4. The cathodic electrodeposition paint according to claim 2, wherein said bisurethane is a urethane prepolymer-based symmetric bisurethane produced by reversibly blocking a diisocyanate urethane prepolymer containing the soft segment with a monoalcohol.

5. The cathodic electrodeposition paint according to claim 1, wherein the weight ratio of said cationically modified epoxy resin to said blocked polyisocyanate crosslinker is from 95:5 to 45:50 as solids.

6. In a cathodic electrodeposition paint comprising a cationically modified epoxy resin and a blocked polyisocyanate crosslinker, the improvement wherein said blocked polyisocyanate crosslinker is a bicycloalkane polyisocyanate blocked with a blocking agent, and where the content of an organic solvent in the paint after diluting to a concentration suitable for actual electrodepositon onto a substrate is less than 2% by weight of the paint.

7. The cathodic electrodeposition paint according to claim 6, wherein said bicycloalkane polyisocyanate is 2,5 or 2,6-bis(isocyanatomethyl)bicyclo [2.2.1]heptane, a dimer, a trimer or a polyhydric alcohol adduct thereof, and wherein said blocking agent is a lactam or an oxime.

8. The cathodic electrodeposition paint according to claim 6, wherein said cationically modified epoxy resin contains at least one oxazolidone ring in the molecule.

9. The cathodic electrodeposition paint according to claim 6, wherein the weight ratio of said cationically modified epoxy resin to said blocked polyisocyanate crosslinker is from 95:5 to 45:50 as solids.

10. The cathodic electrodeposition paint according to claim 1, wherein the weight ratio of said cationically modified epoxy resin to said blocked polyisocyanate crosslinker is from 85:15 to 70:30 as solids.

11. The cathodic electrodeposition paint according to claim 6, wherein the weight ratio of said cationically modified epoxy resin to said blocked polyisocyanate crosslinker is from 85:15 to 70:30 as solids.

12. The cathodic electrodeposition paint according to claim 1, wherein the cationically modified epoxy resin has an amine or cation equivalent of 0.3 to 4.0 meq/g.

13. The cathodic electrodeposition paint according to claim 6, wherein the cationically modified epoxy resin has an amine or cation equivalent of 0.3 to 4.0 meq/g.

14. The cathodic electrodeposition paint according to claim 1, wherein the paint contains less than 500 ppm of lead ions.

15. The cathodic electrodeposition paint according to claim 6, wherein the paint contains less than 800 ppm of lead ions.

16. The cathodic electrodeposition paint according to claim 1, wherein the paint contains a lead-containing pigment.

17. The cathodic electrodeposition paint according to claim 1, wherein the paint contains a lead-containing pigment in an amount such that the paint contains from 350 to less than 800 ppm of lead ions.

* * * * *